United States Patent [19]

Nihira

[11] Patent Number: 4,663,982

[45] Date of Patent: May 12, 1987

[54] GOVERNOR DEVICE FOR PRINTER

[75] Inventor: Shohachi Nihira, Tokyo, Japan

[73] Assignee: Citizen Watch Co., Ltd., Tokyo, Japan

[21] Appl. No.: 734,029

[22] Filed: May 14, 1985

[30] Foreign Application Priority Data

May 18, 1984 [JP] Japan ................................ 59-101422

[51] Int. Cl.[4] ......................... F16F 15/10; B41J 19/76

[52] U.S. Cl. ....................................... 74/574; 400/569; 400/574; 400/577

[58] Field of Search ................. 74/574, 142, 112, 435; 400/569, 574, 574.1, 577

[56] References Cited

U.S. PATENT DOCUMENTS

| | | | |
|---|---|---|---|
| 2,386,402 | 10/1945 | Lilja | 74/574 |
| 2,800,026 | 7/1957 | Kurzina | 74/574 |
| 2,869,700 | 1/1959 | Bowden | 74/574 |
| 3,001,419 | 9/1961 | Hymans et al. | 74/574 |
| 3,319,477 | 5/1967 | McVicker | 74/112 |
| 3,490,060 | 1/1970 | Mazza | 74/142 |
| 3,772,917 | 11/1973 | Lutz et al. | 74/435 |
| 3,882,735 | 5/1975 | Shimodaira et al. | 74/435 |
| 4,049,985 | 9/1977 | Sudler | 74/574 |
| 4,365,904 | 12/1982 | Mueller et al. | 400/577 |

OTHER PUBLICATIONS

"Quick Acting Backcheck Mechanism . . . ", Shadwick, IBM Tech. Disc. Bulletin, vol. 22, No. 7, p. 2809, Dec. 1979.

*Primary Examiner*—Lawrence Staab
*Attorney, Agent, or Firm*—Koda and Androlia

[57] ABSTRACT

In a governor device for a printer including a driving wheel rotating for a predetermined amount by means of urging force by a urging spring to feed paper and engaging with a stopper to stop at this position and a governor gear train consisting of a speed-up gear engaged with the driving wheel and a fly wheel to perform the governing action. The governor device for a printer further includes a wind-up gear engaging with the driving wheel and a friction slip device attached to the fly wheel in the governor gear train to absorb the bounce when the driving wheel stops.

2 Claims, 5 Drawing Figures

GOVERNOR DEVICE FOR PRINTER

BACKGROUND OF THE INVENTION

1. Field of the Invention

The present invention relates to a governor device for a printer, and, more particularly, to an improvement of a governor device for a printer having a driving wheel which is capable of a sudden stop at a predetermined position after a certain amount of rotation by means of an urging spring to feed the paper.

2. Description of the Prior Art

There has been a well-known governor device for a printer which controls and retains a rotating speed of a driving wheel which is provided with rotational urging force. This device has been widely used as a mechanical time delay, in a pawl gear driving system which moves at a slow speed with a predetermined stroke, or the like. In the governor device for a printer of this kind, in order to determine a predetermined mechanical operating position with high accuracy that has been a well-known device having a stopper to hold the driving wheel at a predetermined position, which can keep, for example, the amount of moving of the pawl gear to be a constant in the pawl gear driving system. In the prior art device of this kind, however, the driving wheel makes reverse rotation after a collision with and bouncing off a stopper, since the driving wheel with comparatively large rotating energy is suddenly stopped by the stopper. In the normal governor device, since the driving wheel is geared with a governor gear train for governing action, sudden reverse rotation of the driving wheel as mentioned above provides such an excessive load to the governor gear train that it causes damage in the gear train, for example, lack of of gear teeth, looseness between the gear and its shaft, etc. Furthermore, generally a large space is required to provide the gear train.

SUMMARY OF THE INVENTION

Accordingly, it is an object of the present invention to provide a governor device for a printer which absorbs an excessive load made to the governor gear train and others at the stopping and the reversing of rotation of the driving wheel to prevent the device and the gear train from being damaged can be provided in the smaller space.

In keeping with the principle of the present invention, the object is accomplished with a governor device for a printer, wherein the governor device for a printer includes a driving wheel rotating for a predetermined amount by means of urging force by an urging spring to feed paper and engaging with a stopper to stop at this position and a governor gear train consisting of a speed-up gear engaged with the driving wheel and a fly wheel to perform the governing action which comprises a windup gear engaging with the driving wheel and a friction slip device attached to the fly wheel in the governor gear train to absorb the bounce at the stop of the driving wheel.

DETAILED DESCRIPTION OF THE EMBODIMENTS

Figure 1:
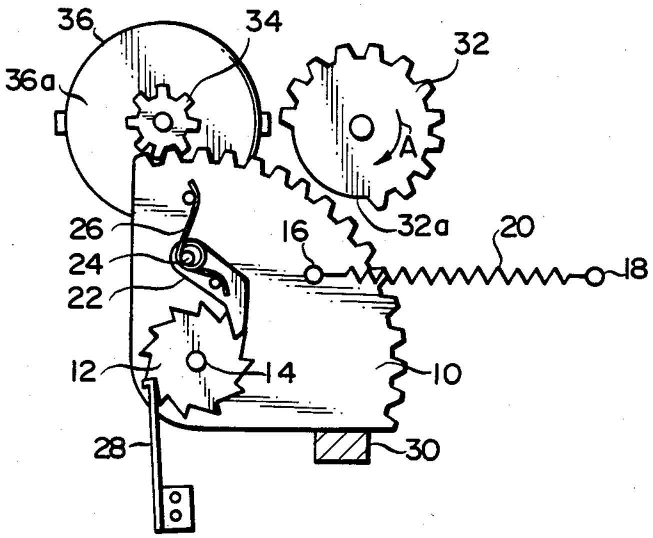
FIG. 1 is an illustration describing an embodiment of a governor device in accordance with the teachings of the present invention.

In FIG. 1 shown therein is a preferred embodiment in which a governor device for a printer in accordance with the teachings of the present invention is applied to a paper feeding system. An driving wheel 10 with a sector-shape is rotatingly pivoted to a shaft 14 which a pawl gear 12 is also fixed thereto. A urging spring 20 is tensioned between a pin 16 provided on the driving wheel 10 and a fixed pin 18 to provide the rotation driving force to the driving wheel 10.

On the side of the driving wheel 10 a pawl 22 is rotatingly pivoted to a shaft 24 and its tip end is always urged toward the pawl gear 12 by a spring 26. To the pawl gear 12 a positioning spring 28 fixed to a base plate, not illustrated, is urgingly engaged thereto so that the static position of the pawl gear 12 can be adjustingly set.

Within a rotating area of the driving wheel 10 mentioned above there is arranged a stopper 30 which limits the driving wheel 10 to stop at the position thereat.

In the close vicinity of the driving wheel 10 provided therein is a wind-up gear 32 which has a non-teeth portion **32*a* on its circumference. The engagement between the driving wheel 10 and the wind-up gear 32 is released at such position when this non-teeth portion 32*a* faces the driving wheel 10**.

The governor gear train is attached and geared with the driving wheel 10 for the governing and bounceless action. In the embodiment, the governor gear train includes a pinion 34 being geared with the driving wheel 10 and a fly wheel 38 being frictionally engaged with a fly wheel case 36 which the pinion 34 is fixed to and rotates unitedly with the pinion 34.

Figure 2:
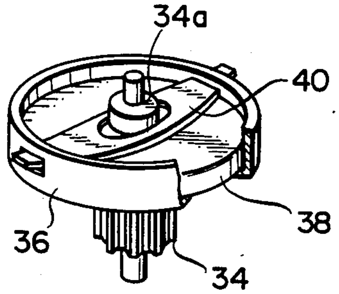
FIG. 2 shows an enlarged perspective view of a fly wheel in a governor gear train in FIG. 1.
Figure 3:
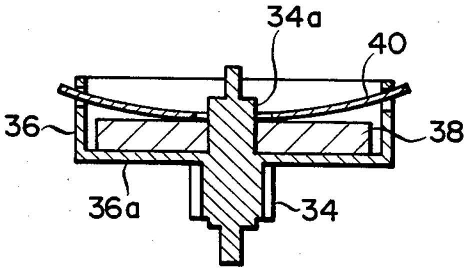
FIG. 3 shows a sectional view of FIG. 2.

The present invention in characterized in that a friction slip device is provided between the fly wheel 38 mentioned above and the end of the governor gear train. In the embodiment, shown in detail in FIGS. 2 and 3, the pinion 34 is solidly formed with the closed side surface **36*a* of a thin cylindrical fly wheel case 36. The fly wheel 38 is rotatably mounted on the pinion shaft 34*a* projected into the above mentioned fly wheel case 36, and further is pressed to the inner surface of the closed side of the fly wheel case 36 by means of a leaf spring 40, two ends of which are fixed to the fly wheel case 36. Thus, frictional slipping is performed between the fly wheel 38 and the fly wheel case 36 which rotates together with the pinion 34**.

The embodiment of the present invention is composed as mentioned hereinabove, and is functions as described hereinbelow.

FIG. 1 shows a state that the driving wheel 10 engages the stopper 30. In this state the driving wheel 10 faces the non-teeth portion **32*a* of the wind-up gear 32 and both the driving wheel 10 and the wind-up gear 32** can rotate freely from each other.

From the state shown in FIG. 1 the wind-up gear 32 is driven and rotated to the direction of an arrow A by a driving force of a winding means, not illustrated, so that the wind-up gear 32 winds up counter-clockwise in FIG. 1 by means of gearing with the driving wheel 10, and the winding-up action stores the urging force in the urging spring 20. The pawl 22 is returned with a predetermined pitch and geared with the pawl gear 12.

When the wind-up gear 32 rotates continuously and its non-teeth portion 32*a* faces to the teeth portion of the driving wheel 10, the driving wheel 10 is disconnected from engagement with the wind-up gear 32, and starts its clockwise rotation by the urging force of the urging spring 20. The rotating speed at this time is governed by the governor gear train including the fly wheel 38 and retained at a predetermined controlled amount.

When the driving wheel 10 rotates clockwise to the stop position of FIG. 1, the driving wheel 10 collides with the stopper 30 by its side and bounces back counterclockwise. In this invention, however, in such bouncing-back action, only the pinion 34 in the governor gear train and the fly wheel case 36 bounce and rotate back reversely together with the driving wheel 10 and the other fly wheel 38 in the governor gear train continues on its normal rotation through the frictional slipping between the fly wheel 38 and the fly wheel case 36. Thus, the sudden stop and bounce of the driving wheel 10 do not provide an excessive load to the governor gear train and do not cause any damage to the gear train. The slipping energy in the friction slip device suppress the bounce of the driving wheel 10 to be smaller and absorbs the bounce very rapidly so that the driving wheel 10 can be returned to the correct stop position shown in FIG. 1.

The suppressing force against the bounce is in proportion to the energy of inertia stored after the friction slip device in the governor gear train, in other words, the fly wheel 38. The increase of the speed-up ratio in the governor gear train or the mass of the fly wheel 38 sets the energy of inertia larger than the bouncing energy of the driving wheel 10, and the preferred suppressing action can be obtained.

Furthermore, the attachment of the friction slip device to the fly wheel 38 at the end of the governor gear train makes it possible to provide the governor gear train in the smaller space.

Figure 5:
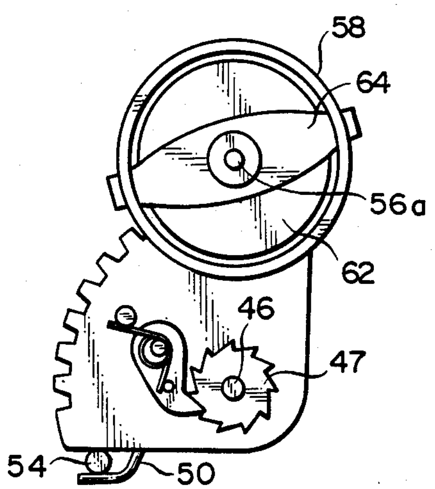
FIGS. 4 and 5 are illustrations describing the other embodiments of the governor device in accordance with the teachings of the present invention.
Figure 4:
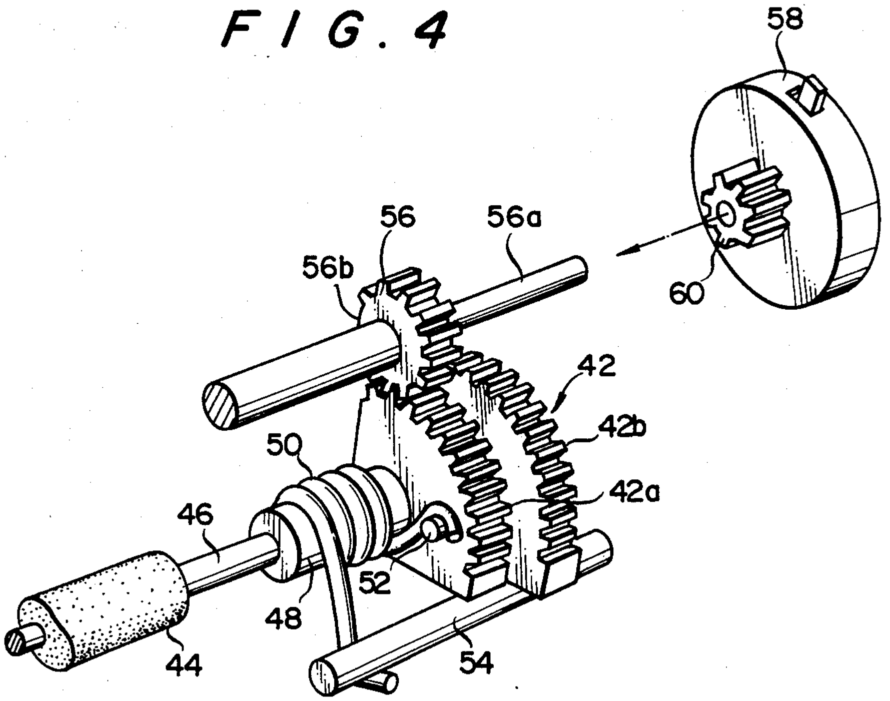

The other embodiment of the governor device for the printer in this invention will be described hereinafter with reference to FIGS. 4 and 5.

The driving wheel 42 solidly formed by two sector-shaped gears 42*a* and 42*b* with two different diameters is rotatingly pivoted by a roller shaft 46 of a paper feeding roller 44 in the printer. On the tip end of the roller shaft 46 fixed thereon is the pawl gear 47.

A coil spring for the urging spring is provided freely to the roller shaft 46 around a cylindrical spring supporter 48 fixed to the sector-shaped gear 42*a* with a smaller diameter. The one end of the coil spring 50 is stopped at a pin 52 provided on the sector-shaped gear 42*a* and the other end is held at a stopper 54 which stops rotating the driving wheel 42 as well.

The pinion 60 solidly formed with the fly wheel case 58 is mounted onto the shaft 56*a* of the wind-up gear 56 which engage with the sector-shaped gear 42*a* and has non-teeth portion, and this pinion 60 is geared with the sector-shaped gear 42*b* which is of larger diameter. The fly wheel 62 is rotatably mounted onto the shaft 56*a* projected into the fly wheel case 58, and pressed onto the inner surface of the closed side by means of the leaf spring 64, two ends of which are fixed to the fly wheel case 58. When the wind-up gear 56 rotates continuously and its non-teeth portion 56*b* faces to the teeth of the driving wheel 42, the engagement between the driving wheel 42 and the wind-up gear 56 is released so that the driving wheel 42 starts to reverse its rotation by means of the urging force from the coil spring 50 to stop at the stopper 54 with a little bounce. At this time, as a frictional slip is performed between the fly wheel case 58 and the fly wheel 62, the excess load provided to the governor gear train and others can be absorbed and damage to the device can be prevented.

Furthermore, according to the present invention, as the fly wheel is provided coaxially with the wind-up gear and the fly wheel has the friction slip device, the governor gear train can be provided in a smaller space.

As described heretofore, according to the present invention, the excessive load provided to the governor gear train and others at the time of the stopping and bouncing of the driving wheel is absorbed to lower the bounce to the minimum and to effectively prevent damage of the device.

Furthermore, as the fly wheel is provided coaxially with the wind-up gear, the governor gear train can be effectively provided in a smaller space.

What is claimed is:

1. A governor device for a printer, wherein said governor device for a printer includes:
   - an urging spring means;
   - a driving wheel for feeding a printing paper, provided to rotate and to stop with a stopper at a predetermined position after an amount of rotation of said urging spring means;
   - a wind-up gear for winding up said driving wheel against the urging spring means; and
   - a governor gear train for governing a paper feed speed comprising:
     - a pinion gear engaging with said driving wheel;
     - a flywheel case secured to said pinion gear;
     - a flywheel rotatably mounted on said pinion gear; and
     - a leaf spring for providing a frictional connection between said flywheel case and said flywheel.

2. A governor device for a printer according to claim 1, wherein said fly wheel is provided coaxially with said wind-up gear.

* * * * *